Aug. 13, 1935.   J. M. CHRISTMAN   2,011,239
MOTOR VEHICLE
Filed July 31, 1933
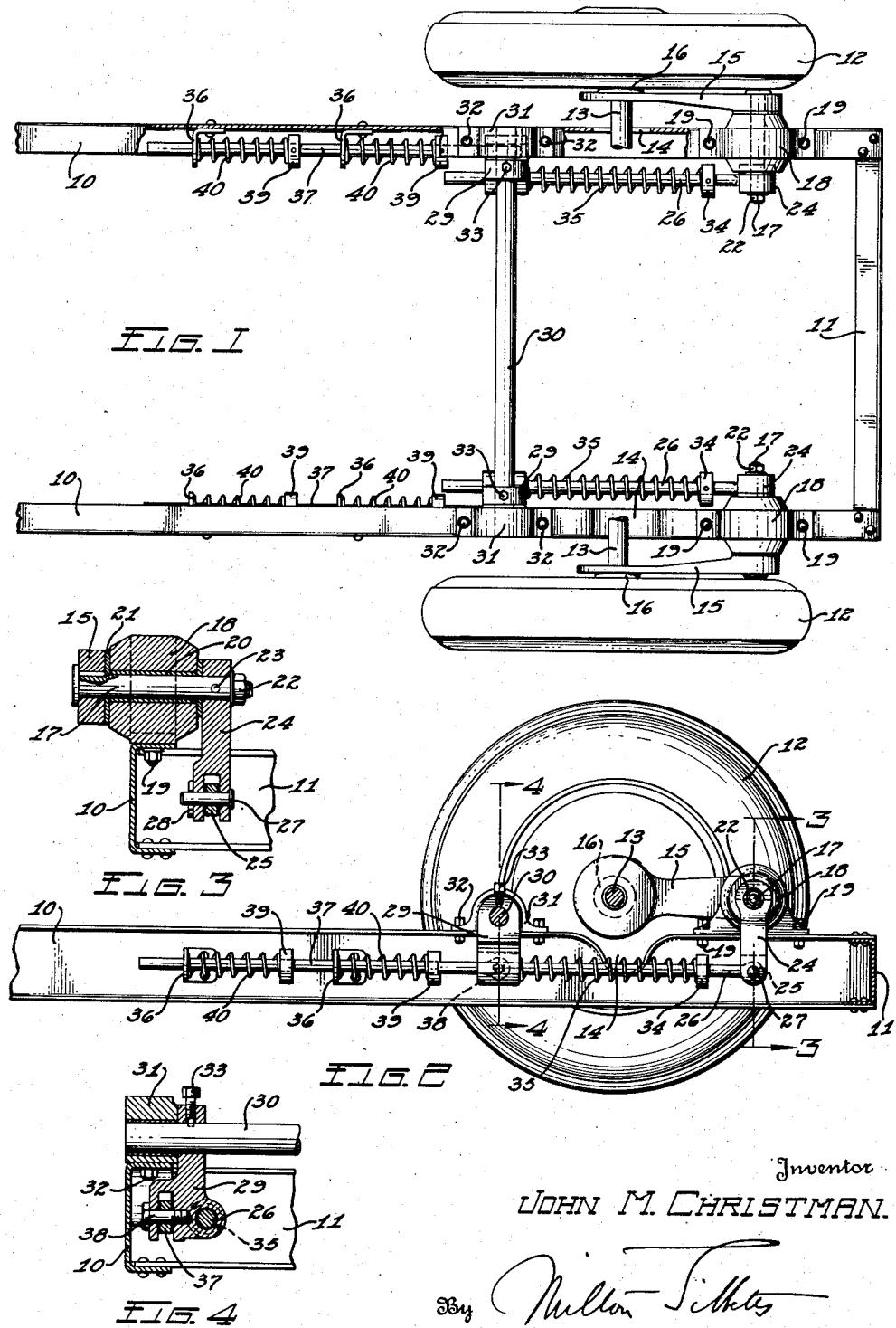
Inventor
JOHN M. CHRISTMAN.

Patented Aug. 13, 1935

2,011,239

UNITED STATES PATENT OFFICE 2,011,239

MOTOR VEHICLE

John M. Christman, Detroit, Mich., assignor to Packard Motor Car Company, Detroit, Mich., a corporation of Michigan Application July 31, 1933, Serial No. 682,906

11 Claims. (Cl. 267—20)

This invention relates to motor vehicles and more particularly to suspension mechanism for motor vehicles.

It is the usual practice in the manufacture of motor vehicles to mount the front and rear wheels on axles which are connected adjacent each end to the body frame by a leaf spring structure. Sometimes the wheels are suspended independently with respect to the body frame. With these types of suspension, alteration in the direction of vehicle travel causes the body to tilt with the uppermost portion on the side toward which the change of direction is being made. Such body tilting action results from centrifugal force caused by inertia tending to continue movement of the body in the direction of previous travel, thereby increasing the compression of the springs on the low side of the vehicle body and lessening the compression of the springs on the high side of the vehicle body. Tilting of the body of a motor vehicle is dangerous at high speeds and obviously objectionable to the occupants at any speed above normal.

An object of the invention is to provide a new and novel form of suspension mechanism for motor vehicles.

Another object of the invention is to provide a vehicle suspension mechanism of a character such that, in changing the course of vehicle travel, body tilting is substantially eliminated.

A further object of the invention is to provide a suspension mechanism for motor vehicles incorporating generally the characteristics of either of the above mentioned types of suspension under normal running conditions and which prevents tilting of the body due to changes in the direction of vehicle travel.

Other objects of the invention will appear from the following description taken in connection with the drawing, which forms a part of this specification, and in which:

Fig. 1 is a plan view, partly broken away and partly in section, showing the rear portion of a motor vehicle chassis having suspension mechanism, illustrative of the invention, associated therewith;

Fig. 2 is a longitudinal sectional view of the same;

Fig. 3 is a sectional view taken on line 3—3 of Fig. 2;

Fig. 4 is a sectional view taken on line 4—4 of Fig. 2.

Referring now to the drawing by characters of reference, 10 indicates side members and 11 the rear member of a motor vehicle frame upon which the body is carried in the usual manner. Rear wheels 12, arranged outside of the side frame members, are rotated by movable axles 13 which are driven from a power plant not shown. In order to allow a desired vertical movement of these axles, the side frame members are recessed, as indicated at 14.

Each wheel is carried by an arm 15 having a hub portion 16 upon which it is rotatably mounted. The arms are keyed to shafts 17 carried in supporting housings or bracket members 18 which are secured one on each of the upper flanges of the side members of the frame by bolts 19. A suitable bearing, as indicated at 20, is provided intermediate each shaft 17 and its supporting housing while a bearing, as indicated at 21, is provided between each arm 15 and its supporting housing. Suitable means, such as nuts 22, are utilized to prevent axial displacement of the shafts 17 from their housings. The wheels can be rotated while carried by the arms and they are free to move arcuately in a vertical direction therewith.

The vertical movement of these wheels is opposed through yielding suspension mechanisms which are inter-related so that tilting of the body will be substantially prevented while the vehicle is changing its direction of travel. A downwardly extending arm 24 is fixed to each of the shafts 17 by a key 23 and the lower ends of these arms are bifurcated to receive the eyes 25 of rods 26. A pin 27 extends through the bifurcated end of each arm and the eye of the associated rod, cotter keys 28 being employed to maintain the pins in position axially.

The rods extend along the side frame members and pass through swingable levers or hangers 29 which are fixed adjacent the ends of a shaft 30 extending transversely of the vehicle frame. Journal housings 31 are secured on the top flanges of the frame side members by means of bolts 32 and serve to rotatably support the ends of the shaft 30. Suitable means, such as bolts 33, fix the hangers to the shaft. The rods 26 have a sliding fit through the hangers 29 so that they can move axially thereof. On each rod is adjustably fixed a collar 34 and encircling each rod between the collar and the hanger is a coil spring 35 having its tension regulated by the axial position of the collar.

Fixed to each of the side members of the frame, forwardly of the journal housings, are a plurality of spaced brackets 36 through each series of which a rod 37 is slidably mounted. The rear ends of these rods terminate in eyes which project into bifurcated portions of levers 29 where they are pivotally mounted by bolts 38. Axially adjustable collars 39 are fixed on each of the rods 37 and coil springs 40 encircle the rods intermediate each bracket member and collar, the tension of such springs being regulated by the axial positions of the collars.

The arms 15 and 24 are fixed to the shafts 17 and each such assembly forms a bell crank at one end of which a wheel is rotatably mounted and at the other end of which a rod 26 is pivotally connected. The springs 40 at each side of the frame are under a tension the sum of which is equal to that of the adjacent spring 35 and it will be understood that a single spring could be employed in place of the pair of springs 40 in each set, the illustrated form being preferable for motor vehicles because the arrangement is least apt to interfere with other parts of the vehicle.

When the wheels move relative to the body because of depressions or elevations in the road surface, then the spring mechanism will act in a manner similar to the type of spring mechanism, previously referred to, wherein there is a leaf spring between each end of the axles and the body frame. Thus in normal operation this suspension mechanism has all of the advantages of the referred to types of mechanism. When the course of the vehicle is being changed, inertia tends to continue the movement of the body carrying frame in its previous direction of travel with the result that centrifugal force tends to tilt the body upwardly on the side toward which the vehicle is turning and downwardly on the other side. With the herein described suspension mechanism, body tilting caused by centrifugal force when changing the direction of vehicle travel is substantially eliminated. As the low side pivot 17 tends to move downwardly from normal position when the course of travel is being changed, the rod 26 connected thereto is moved forwardly and carries the associated hanger therewith due to the related spring 35. The hangers will be moved together because they are both fixed to the shaft 30. Gravity of the body carrying frame will move the other pivot point 17 so that the associated rod 26 follows its hanger during this rotation of the shaft 30 and thus the two bell crank units are maintained in a parallel relation so that there will be substantially no tilting of the body carrying frame under such circumstances and any slight tilting which occurs is due to inertia delay in transferring forces from one side of the suspension mechanism to the other side.

The suspension mechanism herein described will thus improve the riding qualities of a motor vehicle when its course of travel is changed and will provide a comfortable ride for the occupants of the motor vehicle under all other circumstances as one of the wheels can move vertically a small distance before the movement is transmitted to the other wheel through the suspension mechanism.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a motor vehicle, the combination of a frame, a pair of wheels independently mounted on opposite sides of the frame, and suspension means between the wheels and associated with the frame, said means having relatively movable elements responsive to gravity of the frame to maintain the frame substantially parallel with the road surface when the direction of vehicle travel is being changed.

2. In a motor vehicle, the combination of a body carrying frame, a pair of wheels pivotally mounted independently on opposite sides of the frame, and connecting means between the wheels having relatively movable elements maintained in a relation by gravity of the body to hold the body carrying frame substantially parallel with the road surface when the direction of travel is being changed.

3. In a motor vehicle, the combination of a frame, a pair of oppositely disposed road wheels, a pair of means pivotally mounting said wheels independently to the frame, and interconnected spring suspension means between the mounting means and the frame operable by gravity of the frame to maintain the pair of means substantially in parallel relation.

4. In a motor vehicle, the combination of a frame, a pair of oppositely disposed road wheels, a bell crank pivotally connecting each wheel to the frame, opposed coil springs at each side of the frame, a hanger intermediate each set of opposed coil springs, a shaft extending transversely of and mounted on the frame, said hangers being fixed to the shaft, rods slidable in the hangers and connected to the bell cranks, and means fixed on said rods normally holding a portion of the opposed springs in tension against the hangers.

5. In a motor vehicle, the combination of a frame, a pair of oppositely disposed road wheels, individual means pivotally mounting each wheel on the frame, spring means connecting each mounting means with the frame, each spring means including a delayed motion transmitting connection, and a connection between said pair of spring means whereby the action of one will react on the other in a manner allowing gravity to maintain the frame substantially parallel with a line across the road contact points of the wheels.

6. In a motor vehicle, the combination of a frame, a pair of oppositely disposed road wheels, individual means pivotally mounting each wheel to the frame, a hanger pivotally mounted to the frame in advance of each wheel mounting means, spring means on the frame opposing forward movement of the hangers, means connected to the mounting means slidably engaging the hangers, spring means anchored to the slidable means and engaging the hangers opposing rearward movement of the hangers, and means fixing the hangers together.

7. In a motor vehicle, the combination of a frame, a pair of oppositely disposed road wheels, separate means pivotally mounting each wheel to the frame, interconnected spring means associated with the frame and each wheel mounting, and a connection between each wheel mounting means and the spring means through which the transmission of motion is delayed.

8. In a motor vehicle, a frame, a pair of road wheels disposed on opposite sides of the frame, means pivotally mounting each wheel to the frame, and suspension means between the frame and the mounting means including interconnected pairs of opposed springs and a connection between the suspension means and the wheel mounting means through which motion transmission from one mounting to another is delayed.

9. In a motor vehicle, the combination of load carrying means, oppositely disposed wheels mounted independently on the load carrying means and movable vertically relative thereto, and interconnected suspension means between the wheels and the load carrying means opposing vertical movement of the wheels relative to the load carrying means, said suspension means being adapted to transmit similar vertical movement from one wheel to the other after a limited initial vertical movement thereof.

10. In a motor vehicle, the combination of a frame, a pair of oppositely disposed road wheels, separate means pivotally mounting each wheel to the frame, interconnected suspension means associated with the frame and each wheel mounting, and a connection in the suspension means, said connection including means through which the transfer of motion is delayed.

11. In a motor vehicle, the combination with a frame and mountings for opposite wheels pivoted on said frame, of means interconnecting said mountings so that they will move substantially together, said means having connections through which the transmission of the motion is delayed, and balanced spring means associated with said interconnecting means and said frame.

JOHN M. CHRISTMAN.